(No Model.)
H. B. GLEASON.
WATER MOTOR.
No. 451,170. Patented Apr. 28, 1891.
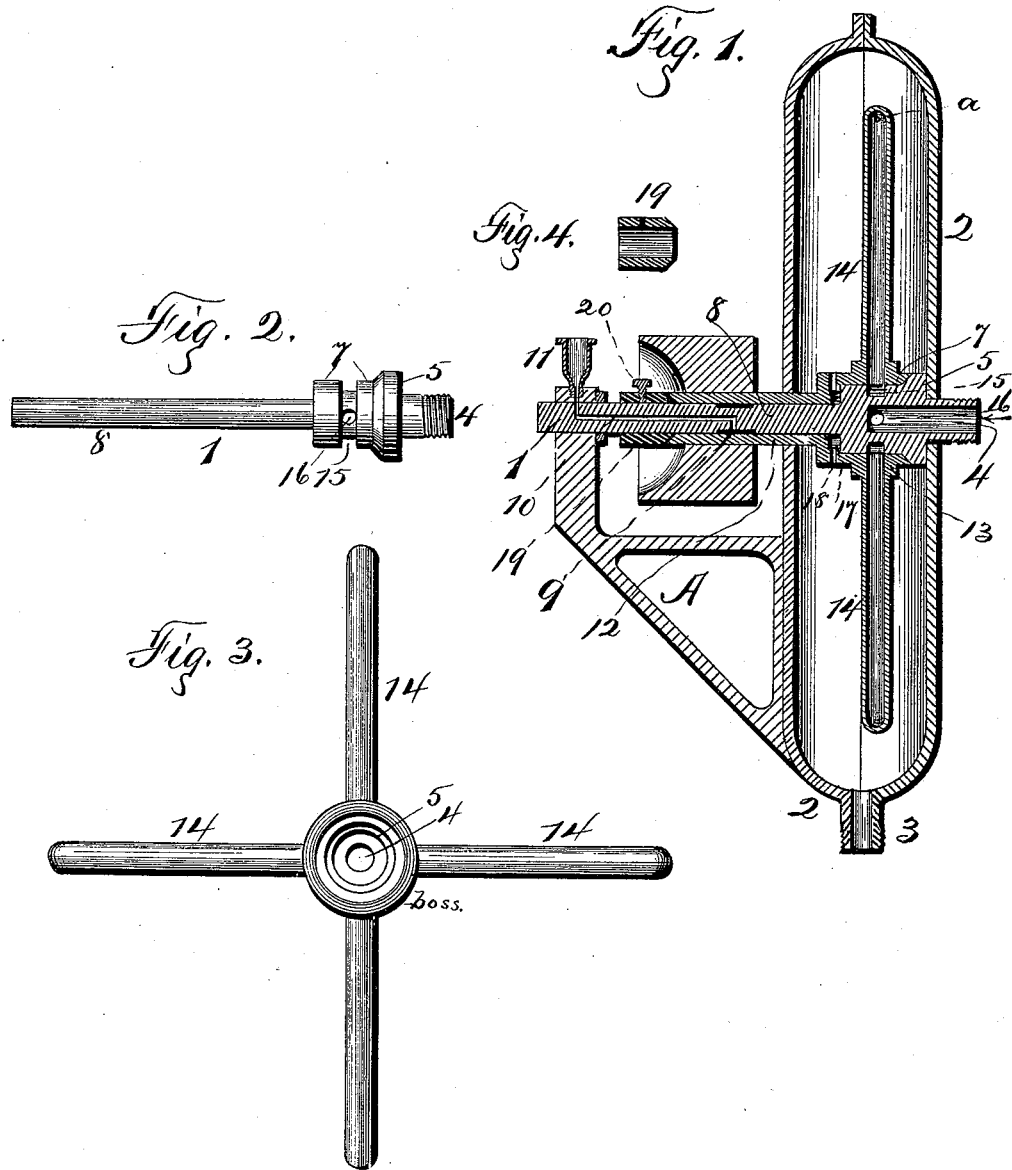
WITNESSES:
Henri B. Gleason INVENTOR
BY Smith + Denison his ATTORNEYS

UNITED STATES PATENT OFFICE.

HENRI B. GLEASON, OF ONEIDA, NEW YORK.

WATER-MOTOR.

SPECIFICATION forming part of Letters Patent No. 451,170, dated April 28, 1891.

Application filed August 4, 1890. Serial No. 360,899. (No model.)

*To all whom it may concern:*

Be it known that I, HENRI B. GLEASON, of Oneida, in the county of Madison, in the State of New York, have invented new and useful Improvements in Water-Motors, of which the following, taken in connection with the accompanying drawings, is a full, clear, and exact description.

My invention relates to water-motors.

My object is to produce a motor which will produce the maximum amount of power with the minimum quantity of water, in which the hub of the motor-arms and the shaft carrying the drive-pulley consist of a sleeve mounted upon a stationary bearing, to one end of which the feed-pipe is secured, and which is recessed to permit of the flow of water through into the motor-arms.

My invention consists in the several novel features of construction and operation which are hereinafter described, and which are specifically set forth in the claims annexed. It is constructed as follows, reference being had to the accompanying drawings, in which—

Figure 1 is a vertical longitudinal section. Fig. 2 is a side elevation of the stationary arbor. Fig. 3 is a front elevation of the motor arms and hub. Fig. 4 is a longitudinal section of the collar.

A is a bracket or support suitably mounted and to which the stationary arbor 1 is secured on top, and the shell or casing 2 is also secured to the lower end. This casing is of circular form, is made in sections, substantially as shown, secured together in any usual manner, and is provided with a discharge-pipe 3 at the lower end. The outer end of the arbor 1 is threaded and bored out, as at 4, and is next enlarged to form a head 5, tapered rearwardly down to the hub 7, which meets the stem 8 with a square shoulder. The outer end of the arbor fits through an opening in the center of the outer half of the casing. The stem is reduced in size at 9 to create an oil-chamber, and 10 is a duct leading thereto from an oil-cup 11, mounted upon the bracket. A sleeve 12 fits over this stem, and it is provided with an enlargement 13 upon its outer end, recessed to fit over the hub 7 and beveled inwardly to fit closely against the taper between this hub and the head 5. This enlargement constitutes a hub for the motor-arms 14, which are secured therein, and which are tubular, closed at the outer end, and provided with a discharge-opening *a* on one side near the outer end, and their inner ends open through their hub into a circumferential groove 15 in the hub 7, and this recess opens into the recess 4 through ports 16. The motor-arm hub is recessed deep enough to leave a chamber 17 around the stem behind the arbor-shoulder, and 18 are ports opening out through this hub into the casing. The inner end of the sleeve is beveled inwardly, and 19 is a collar loose upon the arbor-stem, beveled on its outer end to fit into the beveled end of the sleeve, and 20 is a set-screw for securing this collar in close contact with the sleeve, and thereby hold it in proper position.

The water-supply pipe is connected to the outer end of the arbor 1, and then the water enters the recess 4, passes through the ports 16 into the groove 15, and thence flows into the arms 14 and through the discharge-openings *a* into the casing, causing the rotation of the arms and sleeve, and the water escapes from the casing through the discharge.

The rotation of the motor-arm hub and the sleeve connected thereto rotates the drive-pulley 21, which is secured upon the sleeve.

Any backward leakage from the recess 15 is caught in the chamber 17, and is discharged through the ports into the casing, so that no water enters the joint between the sleeve and the arbor-stem.

The sleeve and stem pass rearward through the rear part of the casing.

What I claim as my invention, and desire to secure by Letters Patent, is—

1. A motor consisting of a stationary arbor provided with a recessed outer end, a hub, an inwardly-beveled head upon the hub, a groove around the hub, and ports connecting the groove and recess in the arbor, in combination with a sleeve fitting over the stem and enlarged to fit over the arbor-hub, beveled to abut against the head thereon, a collar upon the stem beveled upon its outer end and fitting into the beveled rear end of the sleeve, and means for securing the collar in contact with the sleeve, and a casing inclosing the arms.

2. The combination, with the stationary arbor, the hub thereon, the groove in the hub, and the ports opening inward therefrom into the recess in the hub opening outward through the outer end of the arbor, of a sleeve fitting over the hub, a chamber between the sleeve and the rear end of the hub, and ports opening outward therefrom.

In witness whereof I have hereunto set my hand this 1st day of August, 1890.

HENRI B. GLEASON.

In presence of—
HOWARD P. DENISON,
HUGH PARKER.